United States Patent [19]

Klingel

[11] Patent Number: 4,583,719

[45] Date of Patent: Apr. 22, 1986

[54] MACHINE TOOL FOR STAMPING, NIBBLING AND THERMAL CUTTING AND THE LIKE

[75] Inventor: Hans Klingel, Moglingen, Fed. Rep. of Germany

[73] Assignee: Trumpf GmbH & Co., Ditzingen, Fed. Rep. of Germany

[21] Appl. No.: 600,487

[22] Filed: Apr. 16, 1984

[30] Foreign Application Priority Data

Apr. 23, 1983 [DE] Fed. Rep. of Germany ....... 3314748

[51] Int. Cl.⁴ .............................................. B23K 7/10
[52] U.S. Cl. ....................................... 266/72; 266/73
[58] Field of Search ............................ 266/48, 72, 73

[56] References Cited

U.S. PATENT DOCUMENTS

| 4,168,056 | 9/1979 | Haley | 266/72 |
| 4,264,058 | 4/1981 | Wear et al. | 266/72 |
| 4,345,744 | 8/1982 | Leibinger | 266/49 |

Primary Examiner—Wayland Stallard

[57] ABSTRACT

A machine tool for flat workpieces such as sheet material includes at least one work station, a first guidance assembly with a workpiece holding device movable in at least one direction relative to the work station and a second guidance assembly with a workpiece holding device independently operable in addition to, or alternatively with, the first workpiece holding device and adapted to be engaged with the workpiece so as to effect its movement independently of or concurrently with the first workpiece holding device. The machine tool desirably includes a computer control for operating the tool work station and the workpiece holding devices, and each of such workpiece holding devices includes at least a pair of workpiece clamping elements with adjustable spacing therebetween. The machine tool may include a pair of machine frames with cantilevered portions extending oppositely of each other and each providing at least one work station or a portion thereof.

10 Claims, 2 Drawing Figures

MACHINE TOOL FOR STAMPING, NIBBLING AND THERMAL CUTTING AND THE LIKE

BACKGROUND OF THE INVENTION

The present invention relates to machine tools, and more particularly to machine tools having one or more work stations and a workpiece guiding and clamping system for moving the workpiece along axes of the machine relative to the work station(s).

Machine tools for performing various types of work upon flat sheet-like workpieces generally include at least one work station having a punching, nibbling, thermal cutting, routing, milling, drilling or like tool(s) to operate upon the workpiece. The workpiece guidance system generally includes a holding device which is movable in at least one direction relative to the work station. Such machine tools may comprise punching machines, nibbling machines, milling machines, plasma cutting machines, and laser cutting machines; routing, drilling or plasma or laser cutting stations may be provided as a second work station on a punching or nibbling machine, or as a separate machine.

The workpiece guidance system generally will include at least two clamping members and functions to move the workpiece during the machining operation relative to the stationary work station and in the plane of the workpiece. This movement or shifting of the workpiece is generally in the X and Y axes of a coordinate guide system, and may include superimposed motions running diagonally, or along an arc, or in a circle. Normally the workpiece comprises a sheet metal plate, and the workpiece holders grip or clamp one of the edges of the sheet metal plate.

As is well known, the machining of the workpiece will frequently be done up to, or nearly to, the edge of the workpiece. Under some circumstances, this can require release and resetting of the workpiece clamping members to permit the previously gripped portion to be advanced relative to the work station for working thereon; this may produce machining accuracies resulting from the releasing and regripping of the workpiece after movement of the clamping members or of the coordinate guidance system.

Moveover, relatively large workpieces vibrate substantially because the center of gravity of the workpiece is at a relatively large distance from the clamping devices. With such large workpieces, the clamping members of the guidance systems are subjected to a heavy loading during acceleration and deceleration in indexing of the workpiece.

It is an object of the present invention to provide a novel machine tool having an improved workpiece guidance system in which the machining of the workpiece in the edge area initially clamped for movement thereof about the machine tool is readily effected without introduction of errors resulting from repositioning of the clamping devices.

It is also an object to provide such a machine tool capable of reducing the load on its guidance assemblies during the acceleration and deceleration of the workpiece during its movement relative to the work station.

Another object is to provide such a machine tool in which the work stations and the working area of the machines may be better utilized to effect working upon substantially the entire surface area of a workpiece.

SUMMARY OF THE INVENTION

It has now been found that the foregoing and related objects can be readily attained in a machine tool for flat workpieces which includes at least one work station having a tool for working upon a workpiece supported in the machine tool. A first workpiece guidance assembly includes a workpiece holding device with releasable workpiece engaging elements for holding the workpiece, and the device is movable in at least one direction relative to the work station and is adapted to be engaged with the workpiece to effect movement thereof. A second workpiece guidance assembly includes a workpiece holding device with workpiece engaging elements for holding the workpiece and is movable in at least one direction relative to the work station. The first workpiece holding device is movable both concurrently with and independently of the second workpiece holding device. Drive means is also provided for effecting movement of the workpiece holding devices, and control means effects operation of the drive means and of the tools at the work station.

Preferably, independent drive means are provided for the individual guidance assemblies, and common control means effects independent and concurrent operation of first and second drive means for the workpiece holding devices independently. In one embodiment, the first and second workpiece holding devices comprise in a common workpiece coordinate guide mechanism and are movable along parallel X and Y axes. The first and second workpiece holding devices may be disposed in opposed, spaced relationship, and the workpiece engaging elements of the first workpiece holding device extend in a direction opposite to the direction of extension of the workpiece engaging elements of the second workpiece holding device.

Preferably, the first and second workpiece holding devices each include two workpiece engaging elements, and the spacing between the two workpiece engaging elements of each workpiece holding device is independently adjustable. In one embodiment, disengageable connecting means mechanically interengages the first and second workpiece holding devices for effecting simultaneous movement thereof.

A second work station may be provided, and it has another tool for performing work upon the workpiece. These work stations are spaced from one another, and the workpiece guidance assemblies are operable to effect movement of the workpiece relative to both stations. The work stations are spaced from one another a fixed distance along an axis extending between the first and second holding devices. The work stations may be disposed at least in part on cantilevered portions of first and second machine frames with the cantilevered portions extending towards each other. The second work station may have a first component located on a cantilevered portion of the second machine frame and a component located on a cantilevered portion of the first machine frame which portion extends over a portion of the second machine frame.

DETAILED DESCRIPTION OF THE ILLUSTRATION EMBODIMENTS

Figure 1:
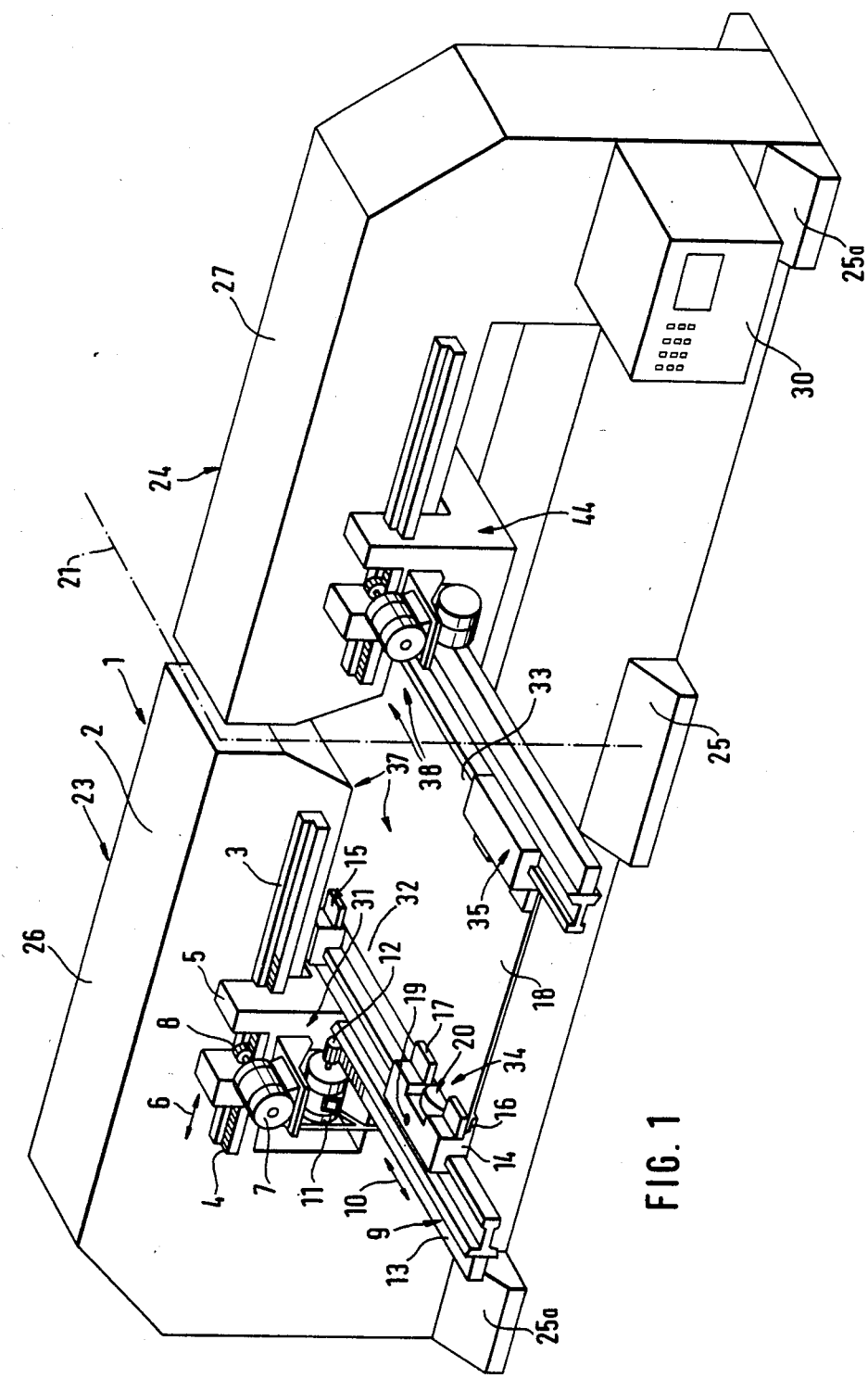
FIG. 1 is a partially diagrammatic perspective view of a machine tool embodying the present invention with the work stations only generally indicated for clarity of illustration.

Turning first to FIG. 1 of the attached drawings, therein illustrated is a machine tool embodying the present invention and generally designated by the numeral 1. In this illustration, the machine tool 1 has a frame 2 defined by left and right hand frames, generally designated by the numerals 23 and 24, which are essentially symmetrical about the plane 21 indicated in phantom line. The frames 23, 24 are joined together by fastening legs 25 secured thereto and to the floor, and are also secured to the floor by the legs 25a at the ends thereof. Various other techniques may also be employed to enhance the fixed relationship therebetween such as interconnected flanges, fish plates and the like. In the illustrated embodiment each of the machine frames 23 and 24 is of generally C-shaped configuration with cantilevered upper arms respectively designated by the numerals 26 and 27.

On each of the cantilevered arms 26 and 27 are supported tooling and its drive mechanism (not shown) providing the work stations 37, 38 adjacent the free ends thereof and cooperating with tooling (not shown) supported on the lower portions of the machine frames 23, 24. A more detailed illustration and description of the work stations will be found with respect to the embodiment of FIG. 2.

Mounted on the arm 26 of the frame 23 is a workpiece support and guide assembly generally designated by the numeral 31 and which includes a rail 3 extending longitudinally thereof and on which is provided a rack gear 4. A support guide 5 is supported on and is movable in either direction along the length of the rack gear 4, as indicated by the double arrow 6. The drive action is effected by the electric motor 7 on the guide 5 through the pinion gear 8 that is in meshing engagement with the rack gear 4.

A workpiece support generally designated by the numeral 9 is carried by the support guide 5 and can be shifted relative thereto in either direction as shown by the double arrow 10. As seen, the pinion gear 12 is driven by the motor 11 which is supported on the guide 5, and the gear 12 has its teeth drivingly engaged with the rack gear 13 which is a part of the workpiece support 9. The direction of motion of the workpiece support 9 is perpendicular to the direction of motion of the support guide 5 on the rack gear 4.

Slidably mounted on the workpiece support 9 is a clamping assembly generally designated by the numeral 34 and including a pair of workpiece clamping members generally designated by the numerals 14 and 15, which are movable along the length of the support 9 in the direction of the double arrow 10 to alter the spacing or positioning thereof. They can be secured in any adjusted position by locking elements 19 such as set screws or the like. Each of the clamping members 14 and 15 has a pair of clamping elements comprised of a fixed lower jaw 16 and a releasable upper jaw 17 which is movable relative to the fixed jaw 16. As seen in FIG. 1, a workpiece 18 is securely clamped along its left hand edge 32 in the jaws 16, 17 of the clamping member 14 and in the comparable clamping jaws of the clamping member 15.

Supported on the machine frame 24 is a second workpiece support and guide assembly generally designated by the numeral guide 44 and corresponding to the guide assembly 31 on the machine frame 23; it has similar drive and support elements. A clamping assembly generally designated by the numeral 35 is carried thereby and serves to grip or clamp the edge 33 of the workpiece 18 opposite that clamped in the guide assembly 31.

All connected to the computer numeric control system 30 for operation thereby are pneumatically operated pistons (not shown) for opening and closing the jaws 17 of the clamping members 14 and 15 of the two clamping assemblies 34, 35, and the drive motors 7 and 11 of the support and guidance assemblies 31 and 44. Thus, the workpiece 18 can be gripped and moved along both axes of the machine 1 as indicated by the double headed arrows 6 and 10, and working may be performed at one or both of the work stations 37, 38 over substantially the entire surface area of the workpiece 18, as will be described more fully hereinafter.

Figure 2:
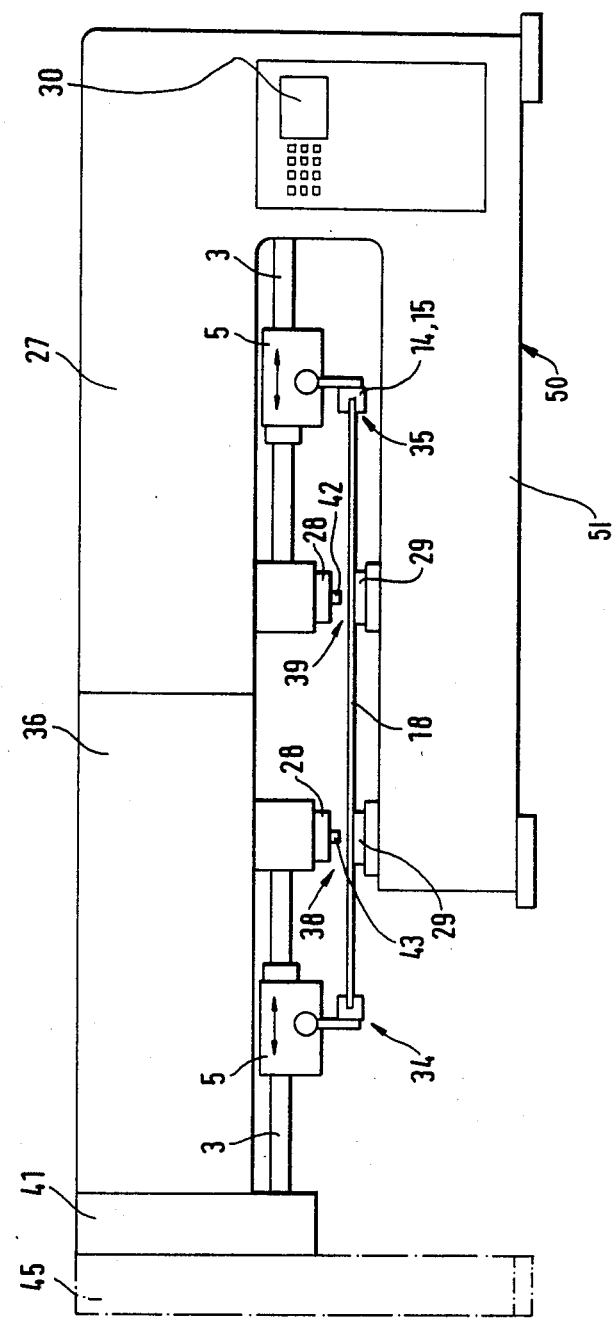
FIG. 2 is a side elevational view of another embodiment of a machine tool embodying the present invention with the work stations partially diagrammatically illustrated.

Turning now to FIG. 2 of the drawings, therein illustrated is another embodiment of machine tool for practicing the present invention. In this embodiment, the main machine frame generally designated by the numeral 50 is again of generally C-shaped configuration with an elongated base 51 and a shorter cantilevered arm 27. Spaced from the main frame 50 is a secondary frame including the vertical support generally indicated in phantom line and designated by the numeral 45, and an arm support 41. A cantilevered arm 36 extends therefrom over the extended portion of the base 51 and abuts the arm portion 27. On the frame 50 is the clamping assembly 35, and on the secondary frame is the clamping assembly 34. The rail 3 on the frame 50 carries the support guide assembly 5 for movement in the direction of the double arrow and it is also movable in a direction perpendicular thereto in the same fashion as indicated with respect to the embodiment of FIG. 1. The clamping members 14,15 of the clamping assemblies 34 and 35 grip the opposing edges of the workpiece 18 in a fashion similar to that in FIG. 1.

In this embodiment, the lower tooling 29 for both work stations 38,39 is supported upon the base leg 51 of the main machine frame 50. The upper tooling 28 for the work station 39 is supported upon the upper arm 27 of the frame 50 and the upper tooling 28 for the work station 38 is supported on the cantilever arm 36. In the illustrated embodiment, the upper tool holders 28 supports punches 42,43 each of which cooperates with a die (not shown) in the lower tool holders 29. Operation of the machine and its components is effected by the computer numeric control system 30.

Turning now to the operation of the embodiment of FIG. 1, the workpiece 18 is placed in position on the support table or base of the machine frame 23 and the clamping members 14, 15 are moved into the desired positions along the edges 32 and 33 thereof. This movement can be effected automatically by the computer numeric control system 30 operating the motors 7 and 11 so long as no change in spacing between the members 14, 15 of either of the assemblies 31, 44 is required. After the clamping members 34, 35 are located in the desired position along the edges 32 and 33, the computer numeric control system 30 effects operation of the pneumatic cylinders (not shown) to clamp the upper jaws 16, 17 of the clamping members 14 and 15 and secure the workpiece 18 firmly.

By operation of the control system 30, the workpiece 18 may now be moved relative to the work stations 37 and 38 to perform the necessary work thereon. In the illustrated embodiment, the control system 30 is simultaneously effecting operation of the drive motors 7, 11 of the guidance assemblies 31 and 44 which are clamped along both edges of the workpiece 18 to distribute the loading on both guidance assemblies.

When it is desired to effect working on the workpiece 18 at one of the work stations 37, 38 adjacent or under one of the clamping members 14, 15 of either of the guidance assemblies 31, 44, the control system 30 effects operation of the pneumatic cylinders (not shown) to release the clamping jaws 16, 17 thereof, and then effects motion of that guidance assembly system 31, 44 to move the clamping members 14, 15 to a position removed from the work station 37, 38 without motion of the workpiece 18 which remains firmly clamped in the clamping assembly 34 or 35 of the other guidance assembly 31,44. Subsequently, the other assembly 31,44 in which it is still clamped is able to effect movement of the workpiece 18 relative to the work stations 37 and 38 to perform work along the opposite edge.

Following working along the released one of the edges 32, 33, the guidance assembly 31, 44 that is cooperating with that edge is again actuated by the control system 30 to move it into a predetermined position and the clamping members 14 or 15 are actuated to clamp the workpiece 18 along that edge. The control system 30 then effects release of the clamping jaws 14,15 of the guidance assembly 31,44 along the opposite edge and the clamping members 14,15 of that guidance assembly are now moved to a position where they will not interfere with working along that edge. The workpiece 18 is then moved by the reclamped guidance assembly relative to the work stations 37 and 38 to perform work along the now released edge.

Should it prove necessary (generally depending upon the dimensions or configuration of the workpiece 18), the clamping members 14 and 15 may be moved on the workpiece support 9 along the length thereof to adjust the spacing therebetween, or to reposition them both along the length of the workpiece support 9. This is done simply by releasing the locking screw 19 and manually moving the clamping members 14,15 to the desired position, following which the locking screw 19 may be tightened to secure the clamping members 14 and 15 in the desired position.

Turning now to the operation of the embodiment of FIG. 2, it is essentially the same as that of FIG. 1 except that the workpiece 18 is initially placed upon the workpiece support of the bed 51 of the machine frame 50.

Both work stations 38, 39 are illustrated as punching or nibbling stations wherein a ram is hydraulically or mechanically actuated so as to be driven downwardly against the workpiece 18. However, either or both of these stations 38, 39 may utilize other types of machine tooling such as for example laser cutting, plasma cutting, routing, milling or the like. Such numerically controlled machine tools are presently well known and widely in use.

As will be appreciated, the machine may have only one work station, or it may have multiple work stations only one of which is being employed with a given workpiece. It is a key aspect of the present invention to utilize the dual workpiece clamping and guidance assemblies to permit the work station(s) to operate over essentially the entire surface area of the sheet material by allowing it to be clamped by separate guidance assemblies each of which is able to effect its controlled motion relative to the work station(s). Of course it is essential that the control system be programmed with the precise positioning of the individual guidance assemblies relative to the work station(s) and to each other, and of their clamping members relative to each other and to the workpiece.

In the most conventional forms of the present invention, the workpiece clamping and guidance assemblies will be disposed along opposite edges of the workpiece for movement along axes which are parallel to and perpendicular to the throat of the machine frame in which located, i.e., the distance between the vertical web portion of the frame and the work station. Relatively large workpieces can thus be supported in part within the throats of each of the machines although the maximum area that can be worked upon at any work station without reorientation within the machine will be the distance represented by the throat.

In both of the illustrated embodiments, the control system 30 effects concurrent or independent operation of the two clamping and guidance assemblies.

To operate the two workpiece guidance assemblies simultaneously, the control system must transmit signals to the guidance assemblies which are the inverse of each other. For example, the control signal to one guidance assembly will call for motion of X units and that to the other will call for motion of -X units.

Although motion along X and Y axes is most commonly employed in such numerically controlled machines, it is also known that the workpiece can be moved along the diagonal represented by such X and Y axes, or along arcs and even circles by proper programming of the control system. Various combinations of motion can be affected by alternating the X and Y drives.

It is also possible to mechanically interconnect the two assemblies so that the control system 30 may effect operation of the motors 7 and 11 of only one assembly to effect movement of both mechanically connected clamping and guidance assemblies.

It is desirable to have the control system automatically effect the clamping or unclamping action of the jaws 16 and 17 of the clamping members 34 and 35 which may then be moved manually to a position along the length of the workpiece support 9 to a position where they do not interfere with the movement of that edge of the workpiece 2 and subsequent working thereon at the work stations 37, 38.

Although the machine control system can effect release of the jaws of both clamping members of a guidance assembly simultaneously, it will be appreciated that the control system can also effect independent release of the jaws of only one of a pair of clamping members of a guidance assembly. In this fashion, one clamping member of one guidance assembly can remain engaged along an edge and cooperate with the pair of clamping members of the other assembly along the other edge so as to enable working in the area of the one clamping member that has been released. The released clamping member can again be reengaged, and the other clamping member along that edge released to permit working in that area. Thus, the desirable clamping and control by two guidance assemblies can be maintained if so desired.

Whichever technique is employed, obviously the workpiece is still retained in a fixed position known to the control system during the shifting and repositioning of the released clamping elements.

It will be appreciated that small workpieces may require only one of the workpiece clamping and guidance assemblies to be engaged with the workpiece. Thus, the control system may disable one of the guidance assemblies which is not required at any given time so as to minimize vibration and power requirements.

It should also be appreciated that the preferred machines of the present invention providing two work stations spaced upon in the direction of the adjacent workpiece clamping and guidance assemblies may also allow simultaneous processing of two separate workpieces, each individually clamped within a guidance assembly and being operated upon at the adjacent work station. Moreover, a single large workpiece may, as a part of the machining operation, be severed into two workpieces which are individually subjected to further processing at the adjacent work station.

Thus, it can be seen that the present invention provides a machine tool wherein the load occurring acceleration and deceleration of the workpiece during its movement is distributed over a pair of workpiece clamping and guidance assemblies. The workpiece may be subjected to the machining operation over substantially its entire surface, and, even when one of the clamping members of a guidance assembly is released, twisting of the workpiece in the machine can be avoided by maintaining clamping engagement of one of the clamping members of that guidance assembly in cooperation with the clamping members of the other guidance assembly. Moreover, the two guidance assemblies can be utilized to process a pair of workpieces either initially loaded into the machine or formed as a result of the machining operation.

Having thus described the invention, I claim:

1. In a machine tool for flat workpieces, the combination comprising:
   A. at least one work station having a tool for working upon a workpiece supported in the machine tool;
   B. a first workpiece guidance assembly including a workpiece holding device having releasable workpiece engaging elements for holding the workpiece, said device being movable in at least one direction relative to said work station and being adapted to be engaged with a workpiece to effect movement thereof;
   C. a second workpiece guidance assembly including a workpiece holding device having workpiece engaging elements for holding a workpiece and movable in at least one direction relative to said work station, said first workpiece holding device being movable both concurrently with and independently of said second workpiece holding device;
   D. drive means for effecting movement of said workpiece holding devices; and
   E. control means for said work station and said drive means.

2. The machine tool in accordance with claim 1 wherein said combination includes independent drive means for said workpiece holding devices of each of said guidance assemblies, and common control means to effect operation of said independent drive means for said workpiece holding devices.

3. The machine tool in accordance with claim 2 wherein said first and second workpiece holding devices are disposed in a common workpiece coordinate guide mechanism and are movable along parallel X and Y axes.

4. The machine tool in accordance with either of claims 1 and 2 wherein said first and second workpiece holdng devices are disposed in opposed, spaced relationship, and said workpiece engaging elements of said first workpiece holding device extend in a direction opposite to the direction of extension of said workpiece engaging elements of said second workpiece holding device.

5. The machine tool in accordance with claim 4 wherein said first and second workpiece holding devices each include two workpiece engaging elements, and the spacing between said two workpiece engaging elements of each workpiece holding device is independently adjustable.

6. The machine tool in accordance with either of claims 1 or 2 wherein there is included disengageable connecting means mechanically interengaging said first and second workpiece holding devices for effecting simultaneous movement thereof.

7. The machine tool in accordance with either of claims 1 or 2 wherein there is included a second work station having a tool for performing work upon the workpiece, said first and second work stations being spaced from one another and said workpiece guidance assemblies are operable to effect movement of the workpiece relative to both stations.

8. The machine tool in accordance with claim 7 wherein said first mentioned work station and said second work station are spaced from one another a fixed distance along an axis extending between the first and second holding devices.

9. The machine tool in accordance with claim 7 wherein said first mentioned and second work stations are disposed at least in part on cantilevered portions of first and second machine frames, said cantilevered portions extending towards each other.

10. The machine tool in accordance with claim 9 wherein said second work station has a first component located on a cantilevered portion of said second machine frame and a component located on a cantilevered portion of said first machine frame extending thereover.

* * * * *